United States Patent [19] [11] 3,715,222
Hieb [45] Feb. 6, 1973

[54] BASIC REFRACTORY
[75] Inventor: Harry L. Hieb, Pleasanton, Calif.
[73] Assignee: Kaiser Aluminum & Chemical Corporation, Oakland, Calif.
[22] Filed: Dec. 21, 1970
[21] Appl. No.: 100,532

[52] U.S. Cl. .................................................. 106/58
[51] Int. Cl. ............................................ C04b 35/04
[58] Field of Search .................................. 106/58, 63

[56] References Cited

UNITED STATES PATENTS 3,383,226   5/1968   Hildinger ............................... 106/58
3,378,383   4/1968   Van Dreser ........................... 106/58

FOREIGN PATENTS OR APPLICATIONS 770,196   10/1967   Canada .................................. 106/58

Primary Examiner—James E. Poer
Attorney—Malcolm C. McQuarrie

[57] ABSTRACT

A fired periclase refractory of enhanced density and volume stability and good high temperature strength and thermal shock resistance is made from a batch comprising relatively coarse aggregate having 97.5 or more per cent MgO and, as matrix material, a pre-reacted grain containing substantial amounts of lime and silica, the ratio of lime to silica being at least sufficient to form dicalcium silicate.

12 Claims, No Drawings

BASIC REFRACTORY

BACKGROUND OF INVENTION

Fired refractories were originally made from a single naturally occurring substance. When such refractory materials are formed into shape by a nonplastic process such as dry pressing, it is customary to use particles of varying size ranges in order to achieve maximum density in the formed shape. In making refractory shapes from nonplastic materials, for example magnesite or periclase, it is customary to refer to the relatively coarse particles of material as aggregate, and the relatively finer material as matrix. During the firing operation the matrix material sinters and coheres together to form a ceramic bond holding the coarser aggregate together. Although the line between aggregate and matrix material is to a certain extent arbitrary, it may be considered that all material coarser than a 100 mesh screen is aggregate, while all material finer than 100 mesh is matrix.

When two different refractory materials, for example magnesite and chrome ore, are used together in a refractory composition, it is known to have the chemical composition of the matrix differ from that of the aggregate. In the past, when a refractory was made from a single refractory material, for example magnesite, it was customary for the composition of both the coarse aggregate and fine matrix material to be the same. In other words, the matrix material in a single component refractory was made by finely grinding the material used for aggregate.

However, in recent years it has come to be recognized that even in a refractory where a single component, for example magnesite or periclase, predominates, there are advantages in having the matrix material of a somewhat different composition from the aggregate. To this end, the practice has arisen in recent years of adding fine materials to the matrix-forming portion of a refractory batch. For example, lime or silica or both may be added to periclase in a brickmaking batch in order to adjust the line to silica ratio in the matrix portion of the refractory, and more specifically to produce a refractory containing more lime and silica in the matrix portion than in the aggregate.

SUMMARY OF THE INVENTION

It has now been found that a superior refractory is made if, instead of adding lime and silica separately to a periclase brickmaking batch, these materials are included in the matrix portion of the batch as components of a prereacted periclase grain containing larger amounts of lime and silica than in the overall batch composition. More specifically, it has now been discovered, according to this invention, that a superior fire basic refractory can be made from a batch consisting essentially of (a) from 60 to 80 percent by weight relatively coarse refractory aggregate, at least 90 percent of which is retained on a 100 mesh screen, said aggregate containing at least 97.5% MgO; and (b) from 20 to 40 percent by weight relatively fine matrix material, at least 95% of which passes a 100 mesh screen, said matrix material containing from 80 to 93%, by weight MgO, from 5 to 10% CaO, and from 2 to 5% $SiO_2$, there being at least 1.7 parts by weight CaO for each part by weight $SiO_2$.

DETAILED DESCRIPTION

The coarse refractory aggregate used is a high purity periclase. Material formed by calcining a natural mineral, for example magnesium carbonate or magnesite, of the requisite purity can be used, but generally it will be more practical to use a synthetic periclase, for example one made from sea water or brine, to obtain the desired MgO content. The aggregate will be sized for good brickmaking practice, as is understood in the industry. For example, it will all pass a 4 mesh screen and contain various size ranges down to 100 mesh. A minor portion of this high purity periclase may pass a 100 mesh screen. As has been mentioned, at least 90 percent of the aggregate will be retained on a 100 mesh screen, and preferably at least 95 percent will be so retained.

The aggregate will normally contain lime and silica as the predominant impurities, and in a preferred embodiment of the invention these will be in such proportion that dicalcium silicate is the principal minor phase. It will be understood that, in addition, the aggregate may contain other normal impurities such as alumina, iron oxide, and the like. It may also contain intentional additives, for example chromium oxide added to the raw material from which the grain has been made in order to promote sintering of the grain.

The refractory batch will contain a major portion of the refractory aggregate, that is to say at least 50%, and up to 90% by weight, of the batch will be coarse aggregate. However, most preferably the aggregate will constitute about 70 percent, for example 65 to 75 percent, by weight of the batch.

The relatively fine matrix material can also be made from a naturally occurring material of the requisite composition, but again it will generally be found most practical to use a synthetic grain. The chemical composition of this prereacted grain can be adjusted by adding to the raw material from which it is made, for example magnesium hydroxide, the requisite amounts of lime, for example in the form of calcium carbonate or hydroxide, and silica to the firing of this grain. The product of this grain can be by any of various well known processes.

The proportions and amounts of lime and silica in the matrix grain are chosen so that the predominant secondary phase in this grain is dicalcium silicate. Thus, there will be at least 1.7 parts by weight, and preferably at least 1.87 parts by weight, CaO for each part by weight $SiO_2$. It will be recognized that the weight ratio of 1.87:1 corresponds to that of dicalcium silicate, containing 2 moles of CaO for each mole of $SiO_2$.

As mentioned, at least 95 percent of the matrix grain will pass a 100 mesh screen, and preferably 98 percent of it will so pass. In addition, from 60 to 75 percent of this grain will also pass a 325 mesh screen. In a preferred embodiment of the invention, about two-thirds, for example from 65 to 70 percent by weight, will be −325 mesh material.

It will be understood that, in making fired refractories according to the present invention, the batch can also contain other conventional ingredients. For example, it may contain a temporary or cold setting bond to impart strength to refractory shapes prior to firing. Also, the batch may contain materials such as sodium nitrate or sodium citrate or citric acid as aids to the pressing and sintering of the refractories. Finally, it will be understood that the fired shapes themselves can also be subjected to well known treatments, for example they may be impregnated with tar or pitch.

In forming refractories according to the present invention, the refractory batch, including any bonding and sintering agents desired, will be mixed with a tempering amount of water and formed into shapes, for example by pressing. Any conventional pressing means may be used, for example a de-airing press. Finally, the shapes will be fired at normal firing temperatures for high periclase compositions, for example to 1700°C.

An advantage of incorporating the lime and silica in the matrix by the method of prereaction is that it avoids the problems of correctly measuring and adequately dispersing small amounts of these materials in the refractory batch. In addition, the fire brick made according to this invention have higher densities, and better volume stability on heating, than comparable refractories made by adding lime and silica to the brick batch.

EXAMPLE 1

A refractory batch was made from 70.2 parts by weight coarse periclase grain, 26.6 parts by weight fine grain, 1.25 parts sodium nitrate, 1.5 parts lignin sulfonate binder, 0.3 part dispersing agent, and 2.2 parts water. This batch, after thorough mixing, was pressed in a conventional brick press and the shapes thus formed were fired at 1600°C.

Th8 coarse grain, all of which passed a 4 mesh screen and 96% of which was retained on a 100 mesh screen, showed the following chemical analysis: 0.36% $SiO_2$, 0.23% $Fe_2O_3$, 0.05% $Al_2O_3$, 0.09% $Cr_2O_3$, 1.12% CaO, 0.19% $B_2O_3$, and (by difference) 97.96% MgO.

The prereacted fine grain, 98 percent of which passed a 100 mesh screen and 67 percent of which passes a 325 mesh screen, and which had a specific surface of about 3000 $cm^2/g$, showed the following chemical analysis, on the fired basis: 3.47% $SiO_2$, 0.34% $Fe_2O_3$, 0.34% $Al_2O_3$, 0.22% $Cr_2O_3$, 6.55% CaO, 0.27% $b_2O_3$ and (by difference) 88.81% MgO.

Bricks made from the batch of example 1 had a density of 187 lbs per cubic foot (pcf) after pressing, 185 pcf after drying at 150°C, and 182 pcf after firing. The average volume change of four specimens upon heating from 150°to 1600°C was a shrinkage of 1.0 percent. The average modulus of rupture at 1482°C of six specimens was 1934 psi.

EXAMPLE 2

A batch of 73 parts by weight coarse refractory grain, 25 parts fine refractory grain, 1 part lignin sulfonate binder and 1.25 parts sodium nitrate was mixed with 2.67 parts water and formed into shapes at a pressure of 10,000 psi. These shapes were dried at 150°C and fired at 1700°C.

The coarse refractory grain, all of which passed a 4 mesh screen and 92 percent of which was retained on a 100 mesh screen, had the following chemical analysis: 0.4% $SiO_2$, 0.2% $Fe_2O_3$, 0.1% $Al_2O_3$, 1.0% CaO, 0.2% $B_2O_3$, 0.1% $Cr_2O_3$, and (by difference) 98% MgO. The fine refractory grain, 98percent of which passed a 100 mesh screen, 67 percent being −325 mesh material, had the following chemical analysis: 4.0% $SiO_2$, 0.5% $Fe_2O_3$, 0.4% $Al_2O_3$, 7.0% CaO, 0.2% $B_2O_3$, 0.3% $Cr_2O_3$, and (by difference) 87.6% MgO.

After drying at 150°C, shapes made from this batch had a density of 184 pcf, the density being substantially the same after firing at 1700°C. The volumetric shrinkage upon heating to 1700°C was 0.2%, and the modulus of rupture at 1260°C was 2516 psi and at 1482°C, 21110 psi.

From the preceding examples it can be seen that, in the preferred embodiment of the invention, the relatively fine matrix grain material contains from about 87.5 to 89 percent by weight MgO, from about 6.5 to 7 percent by weight CaO, and from about 3.5 to 4 percent by weight $SiO_2$.

The preceding example is to be compared with another made with 93 parts of the same coarse refractory grain, but sized so that the composition contained 23 parts passing a 100 mesh screen. This grain was admixed with 1 part lignin sulfonate binder, 1.25 parts sodium nitrate, 3.5 parts calcium carbonate, and 1.4 parts volatilized silica, the calcium carbonate being substantially all −100 mesh and the volatilized silica substantially all −325 mesh. In other words, in the comparison example, the fine prereacted grain of Example 2 was replaced with fine grain of the same composition as that used for the coarse aggregate, together with sufficient calcium carbonate and volatilized silica to provide an equivalent amount of lime and silica. This comparison batch was mixed with three parts water, pressed into brick shapes, and fired at 1700°C. After drying at 150°C, shapes from the comparison batch had a density of 184 pcf, but after firing at 1700°C their density was only 181 pcf. Their volume shrinkage on reheating to 1700°C was 0.4 volume per cent, and their modulus of rupture at 1260°C was 2886 psi, and at 1482°C, 1692 psi.

The importance of limiting the amount of −100 mesh refractory grain of relatively low lime and silica content to 10 percent, and preferably to 5 percent, of that grain, is shown by a case where specimens made according to Example 1 inadvertently contained excess amounts of −100 mesh high purity grain. In this case the density of specimens was 5 to 6 pcf lower than those made according to Example 1, and the modulus of rupture strengths were 650 psi lower.

In the specification and claims, percentages and parts are by weight unless otherwise indicated. Mesh sizes referred to herein are Tyler standard screen sizes which are defined in Chemical ENgineers's Handbook, John H. Perry, Editor-in-Chief, Third Edition, 1950, published by McGraw Hill Book Company, at page 963. For example, a 100 mesh screen opening corresponds to 147 microns. Analyses of mineral components are reported in the usual manner, expressed as simple oxides, e.g., MgO, $siO_2$, although the components may actually be present in various combinations, e.g., as a magnesium silicate.

What is claimed is:

1. A fired basic refractory made from a batch consisting essentially of:
   a. from 60 to 80 percent by weight relatively coarse refractory aggregate, at least 90 percent of which is retained on a 100 mesh screen, said aggregate containing at least 97.5% MgO; and
   b. from 20 to 40 percent by weight relatively fine matrix material, at least 95 percent of which passes a 100 mesh screen, said matrix material containing from about 87.5 to 89 percent by weight MgO, from about 6.5 to 7 percent by weight CaO, and from about 3.5 to 4 percent by weight SiO$_2$, there being at least 1.7 parts by weight CaO for each part by weight SiO$_2$.

2. A refractory according to claim 1 wherein at least 95 percent by weight of said aggregate is retained on a 100 mesh screen.

3. A refractory according to claim 1 wherein at least 98 percent of said matrix material passes a 100 mesh screen.

4. A refractory according to claim 1 wherein from 60 to 75 percent by weight of said matrix material passes a 325 mesh screen.

5. A refractory according to claim 4 wherein from 65 to 70 percent by weight of said matrix material passes a 325 mesh screen.

6. A refractory according to claim 1 wherein said aggregate contains at least 1.7 parts by weight CaO for each part by weight SiO$_2$.

7. A refractory according to claim 1 containing from 65 to 75 percent by weight relatively coarse refractory aggregate and from 25 to 35 percent by weight matrix material.

8. A refractory according to claim 1 made from a refractory batch consisting essentially of (a) about 70 percent coarse refractory aggregate containing about 98% MgO, about 1% CaO, and about 0.4% SiO$_2$, and (b) about 30 percent matrix material containing about 88% MgO, about 7.5% CaO, and about 4% SiO$_2$.

9. A refractory according to claim 8 wherein about 96 percent of the aggregate is retained on a 100 mesh screen, and wherein about 98 percent of the matrix material passes a 100 mesh screen and about 67 percent of the matrix material passes a 325 mesh screen.

10. The method of making a fired refractory shape comprising:
    a. preparing a coarse refractory grain containing at least 97.5% MgO, the remainder of said grain being normal impurities, at least 90 percent of said coarse grain being retained on a 100 mesh screen;
    b. preparing a prereacted matrix grain by firing an admixture of MgO-yielding material with SiO$_2$-yielding and CaO-yielding materials, said prereacted grain containing, after firing, from about 87.5 to 89 percent by weight MgO, from about 6.5 to 7 percent by weight CaO, and from about 3.5 to 4 percent by weight SiO$_2$, there being at least 1.7 parts by weight CaO for each part by weight SiO$_2$, at least 95 percent of said matrix grain passing a 100 mesh screen;
    c. admixing from 60 to 80 percent by weight of said coarse grain with from 20 to 40 percent by weight of said matrix grain;
    d. forming said admixture into refractory shapes; and
    e. firing said shapes.

11. Method according to claim 10 wherein at least 95% by weight of said coarse grain is retained on a 100 mesh screen.

12. Method according to claim 10 wherein said shapes are fired at a temperature of at least 1600°C.

* * * * *